United States Patent [19]
Jong-Pil

[11] Patent Number: 5,467,127
[45] Date of Patent: Nov. 14, 1995

[54] AUTOMATIC OBJECTS TRACING DEVICE OF CAMCORDER

[75] Inventor: Lee Jong-Pil, Seoul, Rep. of Korea

[73] Assignee: Samsung Electronics Co., Ltd., Kyungki-do, Rep. of Korea

[21] Appl. No.: 910,811

[22] Filed: Jul. 9, 1992

[30] Foreign Application Priority Data

Jul. 9, 1991 [KR] Rep. of Korea ............... 91-11623

[51] Int. Cl.⁶ .............................. H04N 5/228; H04N 7/18
[52] U.S. Cl. ........................ 348/169; 348/208; 348/358
[58] Field of Search ................................ 358/125, 126, 358/105, 400, 402; 348/135, 142, 169, 143, 154, 155, 152, 358, 211, 208; H04N 5/225

[56] References Cited

U.S. PATENT DOCUMENTS

| | | | |
|---|---|---|---|
| 4,626,908 | 12/1986 | Tani | 358/111 |
| 4,719,485 | 1/1988 | Shikaumi | 354/400 |
| 4,805,018 | 2/1989 | Nishimura et al. | 358/105 |
| 4,959,714 | 9/1990 | Lo et al. | 358/125 |
| 4,969,036 | 11/1990 | Bhanu et al. | 358/105 |
| 4,969,739 | 11/1990 | McGee | 356/308 |
| 4,984,074 | 1/1991 | Uomori | 358/105 |
| 5,047,850 | 9/1991 | Ishii | 348/699 |
| 5,089,761 | 2/1992 | Nakazawa | 318/811 |
| 5,091,781 | 2/1992 | An | 358/125 |
| 5,107,336 | 4/1992 | Minaki | 358/222 |
| 5,196,688 | 3/1993 | Hesse et al. | 250/203.6 |

*Primary Examiner*—Wendy R. Greening
*Attorney, Agent, or Firm*—Sughrue, Mion, Zinn, Macpeak & Seas

[57] ABSTRACT

The present invention relates to a camcorder, and more particularly, to an automatic objects tracing device of a camcorder. When the camcorder operates with a self-timer function, motion vectors are detected on the image, and it is determined whether there is movement of an object or movement of the camcorder itself. When it is determined that there is movement of the object, the moving direction and quantity of the object are determined and the camera is made to turn in response to the moving of the object. In the case where the position of the camcorder's zoom lens is at the telephoto position, the turning speed of the camera is made to be faster, and in the case where the lens is at a WIDE angle position, it is made to be slower, so that the object is photographed by effectively following it.

16 Claims, 2 Drawing Sheets

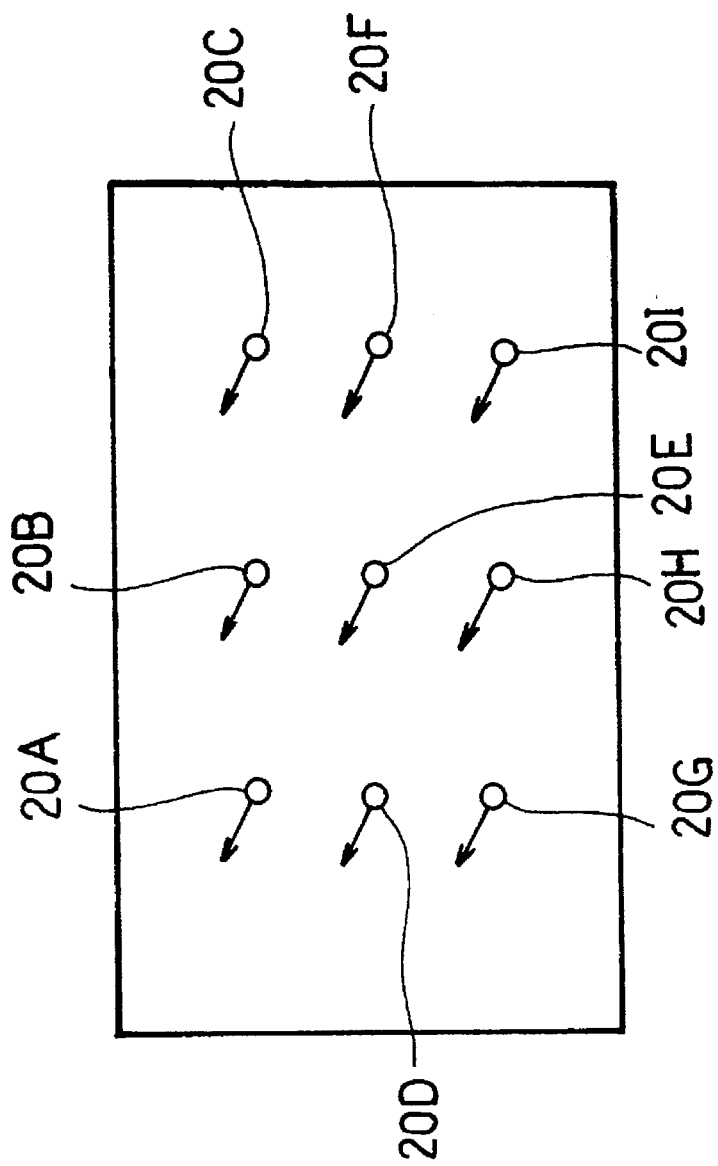

1

AUTOMATIC OBJECTS TRACING DEVICE OF CAMCORDER

TECHNICAL FIELD

The present invention relates to a camcorder, and more particularly to a camcorder having an automatic objects tracing device for automatically following an object to keep it within the picture angle of the camcorder and to control the focussing of the camcorder.

BACKGROUND ART

In general, the operator of a camcorder (video camera) photographs an object by viewing the object through the camcorder lens and following the moving object. However, in cases where pictures are taken through operation of a self-timer function on the camcorder (such as where one photographs oneself by the camcorder), it has not been possible to prevent the object from moving out of the camera angle or becoming out of focus, i.e., if neither the camera angle nor focusing was able to follow the object.

SUMMARY OF THE INVENTION

Therefore, it is an object of the present invention to provide in a camcorder an automatic object tracing device, which is made such that in the case of taking a picture using the self-timer function, even if the object moves to the right or left, the camcorder automatically traces the object to keep the object within the camcorder picture angle and permits the standard auto focus apparatus of the camera to correctly focus on the object rather than on the background.

The automatic object tracing device of the camcorder according to the present invention is made such that when photographing an object via a self-timer function, the deviation of the focus by a moving object is prevented and the exiting of the picture angle by the object is prevented, and which comprises: an A/D converting means for converting a video luminance signal outputted from a video processing section; a movement detecting means which compares a present video luminance signal converted to a digital signal at the A/D converting means and a just prior video luminance signal and thereby detects a moving quantity and direction of the picture as a vector; a zoom position sensing means for detecting a zoom position of a lens; a microprocessor which receives movement information pertaining to the object from the movement detecting means and the zoom position sensing means and thereby judges whether or not there has been movement of the object as well as determining the movement speed; and a motor control means which receives the movement information from the microprocessor and controls a camera turning motor so that the camera automatically follows the object.

BRIEF DESCRIPTION OF THE DRAWINGS

FIG. 2 is a diagram of an example of check points for discriminating between movement of an object and movement of the camcorder.

DETAILED DESCRIPTION OF THE INVENTION

Figure 1:
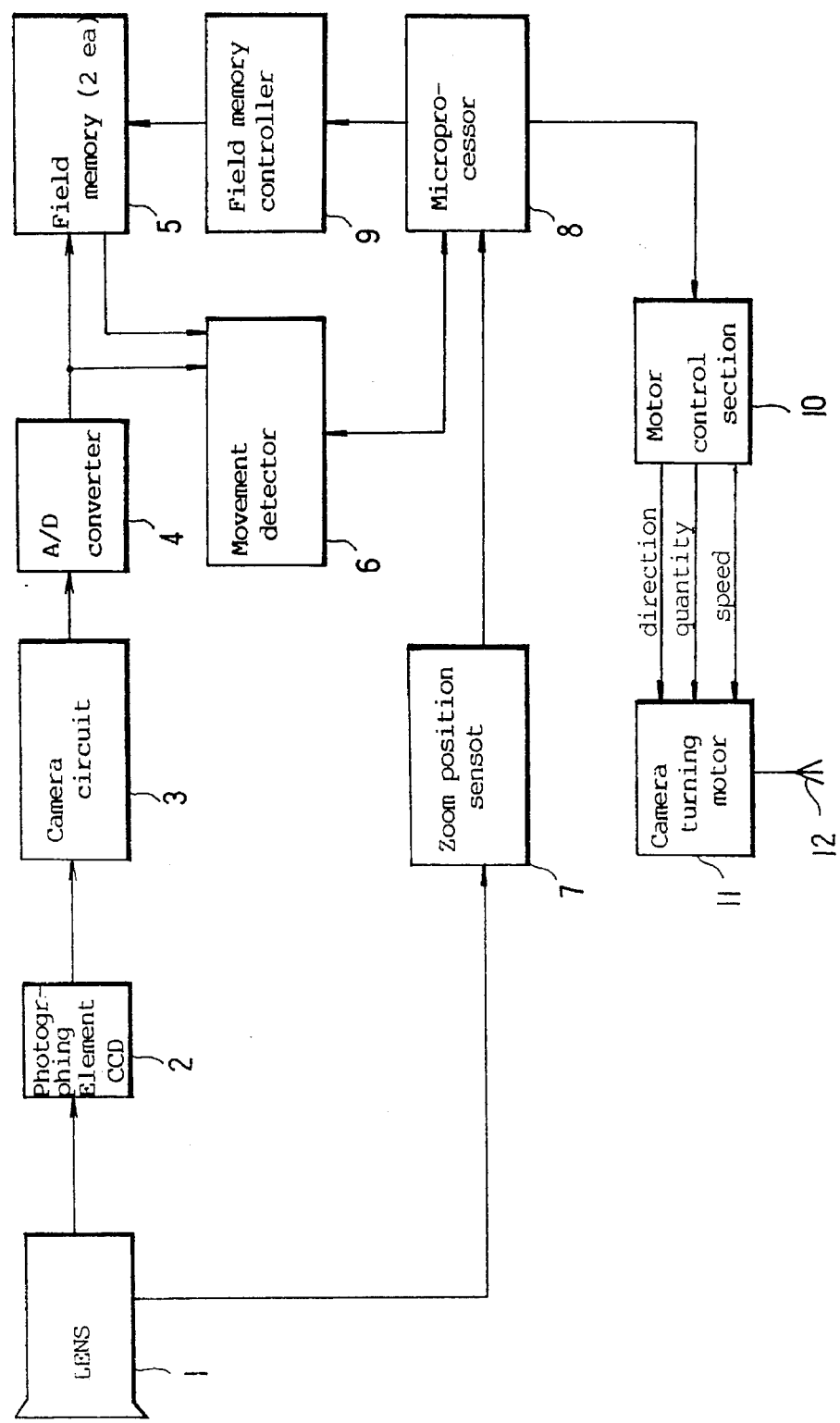
FIG. 1 is a block diagram of an automatic object tracing device of a camcorder in accordance with the present invention.

FIG. 1 is a block diagram showing a preferred configuration of the automatic object tracing device of the camcorder in accordance with the present invention, wherein a reference numeral symbol 1 is a lens for focusing an image of an optical signal of an object, reference numeral 2 is a photographing element CCD for converting the picture image focused via the lens 1 into an electric signal, and reference numeral 3 is a camera circuit section for processing the picture signal converted to the electric signal at the photographing element 2.

Aforementioned lens 1, photographing element 2 and camera circuit section 3 may be constructed in accordance with a basic image processing section of a conventional camcorder, wherein an optical signal of the object focused by the lens 1 is converted photoelectrically into an electric signal at the photographing element 2, and thereafter processed at the camera circuit section 3, consisting of the chrominance signal and luminance signal processing sections, an auto-white balance circuit section, a color difference signal processing section, and a zoom lens control section, and thereby recorded on video tape.

A reference numeral symbol 4 is an A/D converter (Analog to digital converter) for converting the video luminance signal outputted from the camera circuit section 3 into a digital signal; reference numeral 5 is a field memory for temporarily storing a video luminance signal of one (1) frame (=2 fields) converted to the digital signal at the A/D converter 4; reference number 6 is a movement detector for comparing one frame of the present video luminance signal converted to the digital signal at the A/D converter 4 and one frame of the video luminance signal which had just previously been stored in the field memory 5 and thereby detecting a moving quantity and direction of the picture as a vector; reference numeral 7 is a zoom position sensor for detecting the zoom position from the lens 1; reference numeral 8 is a microprocessor which receives information designating the quantity of movement and the direction of movement as well as the zoom position from the movement detector 6 and the zoom position sensor 7; reference numeral 9 is a field memory controller for controlling the field memory 5; and reference numeral 10 is a motor control section which receives information designating the moving direction and quantity as well as speed of the object from the microprocessor 8 and thereby controls a camera turning motor 11. The camera is supported on a tripod 12, and when picture taking is in accord with the self-timer function, the camera turning motor 11 causes a change of direction of the camera supported by the tripod 12.

The field memory 5 consists of two field memories and operates to effectively delay the video luminance signal Yh of two fields (=1 frame) by one frame period.

The field memory 5 controlled by the field memory controller 9 stores temporarily (up to the inputting time of the next frame) one frame of the video luminance signal Yh that was converted to a digital signal by the A/D converter 4.

The movement detector 6 receives as inputs the current frame of the video luminance signal and the prior frame of the video luminance signal from the converter 4 and the field memory 5, respectively, compares the information in the two frames, and thereby detects the moving quantity and direction of the picture as a vector.

Suitable apparatus and technique for the movement detector 6 are as shown in U.S. Pat. Nos. 4,984,074 and 5,047,850, entitled, respectively, "Motion Vector Detector" and "Detector for Detecting Vector Indicating Motion of Image". In accordance with these references, the motion detector seeks motion vectors of a field or a frame. In the motion detector of this invention, the motion vectors are sought so that the moving direction and the moving quantity (distance of movement) of the moving object can be known. The moving direction and the moving quantity thus obtained are provided as inputs to the microprocessor 8.

The zoom position sensor 7 detects and outputs the zoom position of the camcorder. The zoom position is either TELEPHOTO, MIDDLE or WIDE angle position.

It is well known to provide a lens on a camcorder which automatically zooms in and out or which can be manually be controlled to zoom in and out. In the present invention, the position of the lens, so called zoom lens, is detected by a sensor 7 and provided as a signal input to the microprocessor. In the specific embodiment of the present invention, the zoom position of the lens is divided into three positions, designated as TELEPHOTO, MIDDLE or WIDE, respectively. Thus, the sensor provides one of three signal indications, corresponding to one of the three positions of the lens. This zoom position or lens position signal is used by the microprocessor to determine the speed of movement of the object, as will be explained hereafter.

The microprocessor 8 receives the information with regard to the moving quantity and moving direction from the movement detector 6 and determines whether the movement of the picture is caused by movement of the camera or by movement of the object. When it is determined that there is movement of the object, the microprocessor outputs a direction changing signal in accordance with the moving direction and moving quantity. At the same time, the microprocessor 8 receives information relating to the zoom position from the zoom position sensor 7 and determines a direction changing speed for the camera and outputs this as a control signal. That is, it outputs a direction changing signal for driving motor 11 by receiving information with regard to the moving quantity and direction of the object from the movement detector 6 so that the camera is moved in response to the object.

The input from the zoom position sensor controls the speed of turning of the camera motor depending on the nature or position of the zoom. Thus, if the zoom is in the TELEPHOTO position, objects appear much closer than in reality, and the viewing angle of the camera is much narrower than it would be for the MIDDLE or WIDE ANGLE positions. Consequently, when the sensor 7 provides an output indicating TELEPHOTO position, even a small moving quantity means relatively fast movement of the object, and thus the microprocessor controls the motor to turn at a relatively fast speed. Likewise, the microprocessor controls the motor 11 to turn at relative slow and medium speeds when the sensor 7 outputs signals indicating WIDE ANGLE and MIDDLE positions, respectively.

The direction changing signal and the control signal for determining the direction changing speed of the camera outputted from the microprocessor 8 are inputted to the motor control section 10.

The motor control section 10 receives the direction changing signal and the control signal for determining the direction changing speed of the camera outputted from said microprocessor 8, and outputs the control signal in response to the moving quantity and direction of the object and the speed control signal in response to the zoom position, to the motor for changing the direction of the camera.

Techniques for controlling the speed and direction of a motor are well known in the art. Two examples of such apparatus and methods, which would be suitable for the motor control section 10 are shown in U.S. Pat. Nos. 5,089,761 and 4,969,739, which are entitled, "Motor Control System" and "Spectrometer with Direct Drive High Speed Oscillating Grating", respectively.

The motor 11 turns the camera supported by a tripod 12 in accordance with the control signal outputted from the motor control section 10 and traces the object and thereby executes the photographing.

FIG. 2 shows a diagram of an example of check points in which the microprocessor 8 discriminates whether the moving of the picture is caused by movement of the camera itself or by movement of the object. Basically, the microprocessor examines check points on the image and determines whether several check points have resultant movement vectors that are equal. If so, it is judged that the camera, rather than the object, has moved. In particular, as shown in FIG. 2, a multiplicity of check points 20A–20I are illustrated. If respective motion vectors of the picture are detected as being equal at opposing check points, e.g., (20A, 20C), (20A, 20I), (20A, 20G), (20B, 20H), (20C, 20I), (20C, 20G), (20F, 20D), it is determined that the camera itself has moved. If the respective motion vectors of the picture are not detected to be equal at opposing check points, it is judged that it is the object that is moving.

That is, the motion vectors detected as a result of movement of the object will be irregular at a portion of the picture, but the motion vectors detected as a result of movement of the camera will appear equally over the whole picture. But, when the object and the camera are both moving, the motion vectors do not appear equally at the portion positioned with the object. Therefore, when the motion vectors of the picture are equally detected at the opposing check points, it is an indication that only the camera is moving.

The check points shown in FIG. 2 are shown as an example, and wherein a time when a respective check point is put to both upper side corner portions of the picture screen, and even if a time when same motion vectors being detected at each check point of the both corner portions is judged as a moving of the camera, it is a matter of course that same result can be brought.

Thus, the automatic object tracing device of a camcorder in accordance with the present invention has the effect that it can discriminate between the moving of an object and the moving of the camcorder, and in case of the moving of the object, not only is the object followed or traced in response to the moving direction and quantity thereof, but also the tracing speed is controlled in accordance with the zoom position, so that the camera traces the object even if the object moves to the right or the left. Since the object is maintained in the central portion of the viewing angle, the autofocus apparatus will focus on the object, rather than on the background, which is further from the camera than the object, and thereby an out of focus condition can be avoided, as well.

What is claimed is:

1. An automatic object tracing device, of a camcorder of the type which includes a zoom lens and a video processing section, which photographs an object by developing video luminance signals corresponding to an image being photographed, comprising:

A/D converting means for converting said video luminance signals output from said video processing section into digital luminance signals;

movement detecting means for comparing a present one of said digital luminance signals and a previously obtained one of said digital luminance signals to detect moving quantity and direction of said object as a motion vector to thereby generate moving information;

zoom position sensing means for detecting zoom position of said zoom lens;

a microprocessor which receives moving information of said object from said movement detecting means and position information from said zoom position sensing means and determines whether or not there is movement of said object, and a respective moving speed; and motor control means receiving said movement and speed information of said object from said microprocessor for controlling a camcorder turning motor so that said camcorder photographs while automatically tracing said object.

2. The automatic objects tracing device for the camcorder as defined in claim 1, wherein said microprocessor includes means for detecting motion vectors for a plurality of respective predetermined check points designated on said image so as to determine whether said movement is caused by movement of said camcorder or movement of said object, respectively.

3. The automatic objects tracing device of a camcorder as defined in claim 1, wherein said motor control means comprises means for controlling turning direction, turning quantity and speed of said camcorder turning motor.

4. The automatic objects tracing device for the camcorder as defined in claim 2, wherein said microprocessor determines the movement to be caused by respective movement of said camcorder itself, when magnitudes of moving of respective motion vectors are equal for opposing ones of said check points among said check points on said image.

5. The automatic objects tracing device of a camcorder as defined in claim 2, wherein said microprocessor determines said movement to be caused by respective movement of said object, when magnitudes of said motion vectors are different for opposing ones of said check points among said check points on said image.

6. The automatic objects tracing device of a camcorder as defined in claim 2, wherein said check points correspond to at least three points on said image.

7. The automatic objects tracing device of a camcorder as defined in claim 3, wherein said speed of said motor controlled by the motor control means is faster in case of operation corresponding to a telephoto position of said zoom lens and is slower in case of operation corresponding to a WIDE angle position of said zoom lens.

8. The automatic objects tracing device of a camcorder as defined in claim 3, wherein said microprocessor determines said movement to be caused by respective movement of said camcorder itself, when magnitudes of respective motion vectors are equal to opposing ones of a plurality of check points among said check points on said image.

9. The automatic objects tracing device of a camcorder as defined in claim 3, wherein said microprocessor determines said movement to be caused by respective movement of said object, when magnitudes of said motion vectors are different for opposing ones of said check points among said check points on said image.

10. An automatic objects tracing device of a camcorder of the type which includes a zoom lens, a video processing section and an A/D converter generating digital luminance signals from video luminance signals output by said video processing section, which photographs an object by developing said video luminance signals corresponding to an image being photographed, said device comprising:

a movement detector for comparing a present one of said digital luminance signals and a previously obtained one of said digital luminance signals to detect moving quantity and direction of said object as a motion vector to thereby generate moving information;

a zoom position sensor for detecting zoom position information of said zoom lens;

a microprocessor which receives said moving information of said object from said movement detector and said position information from said zoom position sensor and determines whether or not there is a moving of said object, and a moving speed; and a motor controller which receives said moving and speed information of said object from said microprocessor and controls a camcorder turning motor so that said camcorder photographs while automatically tracing said object.

11. The automatic objects tracing device of a camcorder as defined in claim 10, wherein said microprocessor determines source of motion, based on a plurality of respective predetermined check points designated on said image, each of said check points having a respective motion vector so as to permit determination of whether respective movement is caused by movement of said camcorder or by movement of said object.

12. The automatic objects tracing device of a camcorder as defined in claim 11, wherein said microprocessor determines said movement to be caused by the movement of said camcorder itself, when magnitudes of moving of said motion vectors are equal for opposing ones of said check points among said check points on said image.

13. The automatic objects tracing device of a camcorder as defined in claim 11, wherein said microprocessor determines said movement to be caused by movement of the object, when magnitudes of said motion vectors are different for opposing ones of said check points among said check points on said image.

14. The automatic objects tracing device of a camcorder as recited in claim 11, wherein said check points correspond to at least three points on said image.

15. The automatic objects tracing device of a camcorder as recited in claim 10, wherein said motor controller comprises circuitry controlling turning direction, turning magnitude and speed of a camcorder turning motor.

16. The automatic objects tracing device of a camcorder as defined in claim 15, wherein said speed of said turning motor is varied in response to said zoom position information.

\* \* \* \* \*